United States Patent [19]

Miles et al.

[11] Patent Number: 4,909,533
[45] Date of Patent: Mar. 20, 1990

[54] VEHICLE WHEEL SUSPENSION UNIT

[75] Inventors: John Miles; Jeremy J. Booen, both of United Kingdom

[73] Assignee: Group Lotus PLC, of Norwich, Norfolk, England

[21] Appl. No.: 224,856

[22] Filed: Jul. 27, 1988

[30] Foreign Application Priority Data

Jul. 27, 1987 [GB] United Kingdom ............... 8717736

[51] Int. Cl.$^4$ .............................................. B60G 3/18
[52] U.S. Cl. .................................................. 280/673
[58] Field of Search ............. 280/711, 712, 713, 693, 280/688, 702, 673

[56] References Cited

U.S. PATENT DOCUMENTS

| | | | |
|---|---|---|---|
| 2,708,586 | 5/1955 | Wagner | 280/95 |
| 3,510,148 | 5/1970 | Wilfert | 280/673 |
| 3,520,554 | 7/1970 | Ravenel | 280/124 |
| 3,551,990 | 1/1971 | Wehner | 280/673 |
| 4,059,286 | 11/1977 | Otto et al. | 280/673 |
| 4,132,430 | 1/1979 | Bantle | 280/673 |

FOREIGN PATENT DOCUMENTS

| | | |
|---|---|---|
| 0221889 | 5/1987 | European Pat. Off. . |
| 2822058 | 11/1979 | Fed. Rep. of Germany . |
| 3015586 | 10/1981 | Fed. Rep. of Germany . |
| 3007983 | 11/1981 | Fed. Rep. of Germany . |
| 3148726 | 7/1983 | Fed. Rep. of Germany . |
| 990802 | 9/1951 | France . |
| 60-116513 | 6/1985 | Japan . |
| 1357835 | 6/1974 | United Kingdom . |
| 2005605 | 2/1982 | United Kingdom . |

Primary Examiner—Richard A. Bertsch
Attorney, Agent, or Firm—Seidel, Gonda, Lavorgna & Monaco

[57] ABSTRACT

A road vehicle suspension unit particularly suited for the front wheels of a front wheel drive vehicle has an outer subframe consisting of a double-wishbone structure which supports the road wheel and is mounted on a rigid inner subframe so as to accommodate vertical road wheel movement, which is strongly opposed by a spring or damper device. The inner subframe is mounted on the vehicle chassis or body by forward and rear resilient mountings such that horizontal wheel movement also is strongly opposed but with provision for some rearward movement of the wheel by turning of the subframe about an axis through the forward mounting.

16 Claims, 1 Drawing Sheet

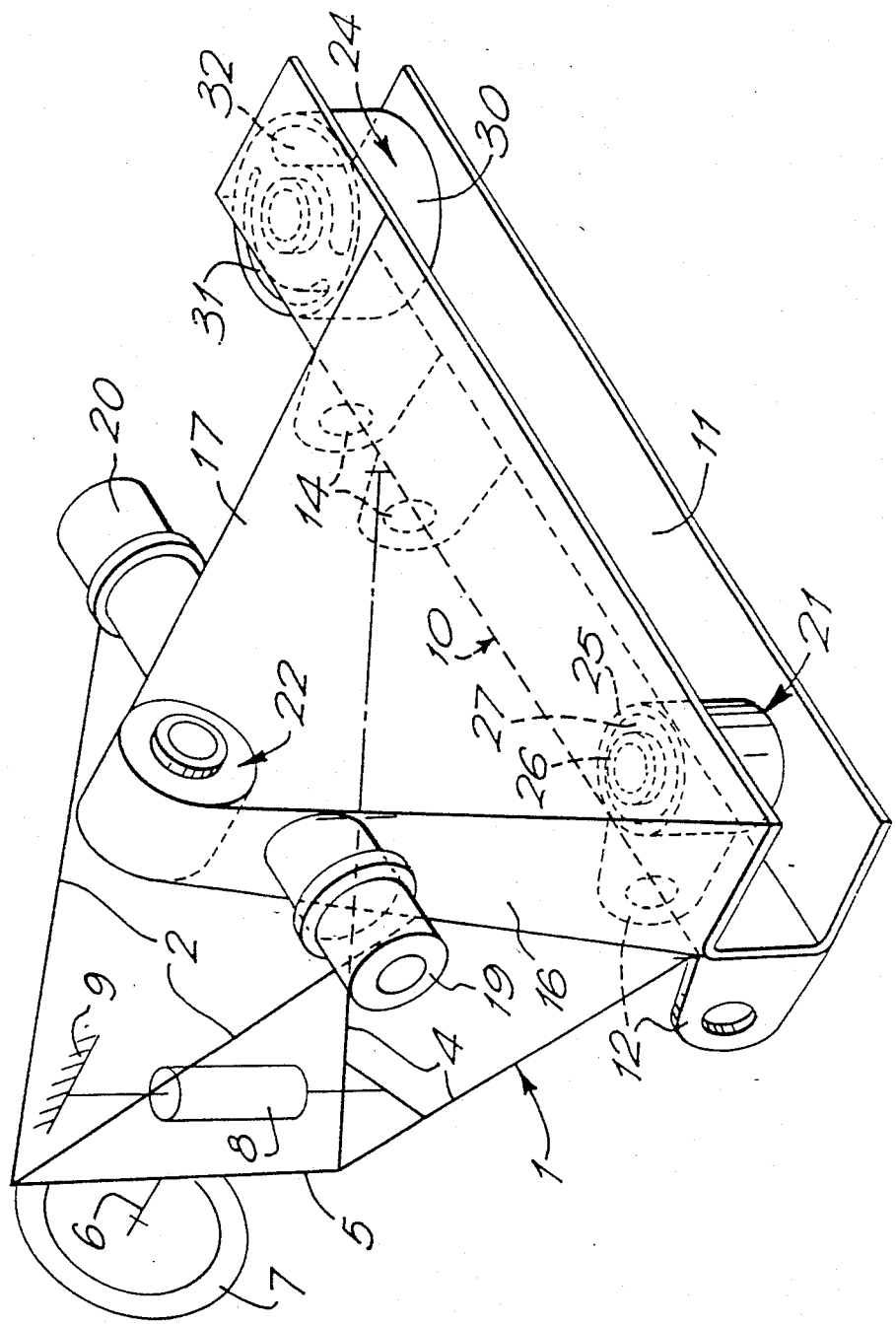

VEHICLE WHEEL SUSPENSION UNIT

FIELD OF THE INVENTION

The invention relates to a vehicle wheel suspension unit.

BACKGROUND OF THE INVENTION

A variety of wheel suspension units and systems have been developed for road vehicles, all with the general object of providing a smooth quiet ride for the vehicle regardless of variable road conditions. It is an object of the present invention to provide a vehicle wheel suspension unit, for use in road vehicles, which is capable of providing optimum wheel location as well as the capacity to accommodate road impacts to a degree appropriate to a normal passenger vehicle.

It is a further object of the invention to provide an improved road vehicle suspension unit which is particularly well suited for use with the front wheels of a front-wheel drive vehicle.

It is an additional object of the invention to provide a road wheel suspension unit for a road vehicle which offers little compliance except to forces acting to move the road wheel rearwardly.

It is also an object of the invention to provide a road wheel suspension unit for a road vehicle in which compliance is provided primarily by means of resilient mounting devices.

SUMMARY OF THE INVENTION

The invention provides a vehicle wheel suspension unit comprising inner and outer subframes, each, subframe having a wheel location function and being capable of reacting suspension forces. A suspension unit of the invention is arranged to oppose forces in all directions, other than a preferred direction, rather stiffly. Thus, the unit can be arranged to oppose forces tending to turn it rearwardly about a forward generally vertical axis less strongly than forces acting in other directions.

The invention also provides a suspension unit comprising an outer subframe which is mounted stiffly on an inner subframe, the inner subframe being mounted to the vehicle chassis by resilient mounting means providing differential compliance.

A suspension unit of the invention can thus comprise an outer subframe carrying the wheel axle, the outer subframe having the form of a double wishbone linkage with spring and damper means which may be conventional, the inner ends of the linkage being pivotally connected to an inner subframe which is connected in turn to the vehicle chassis for limited relative compliance with forces received by way of the outer subframe. The inner subframe can be capable of limited pivotation about a substantially vertical axis located forwardly on the subframe, as by means of forward and rear resilient bushes of which the rear bush preferentially allows the limited pivotation. In this arrangement, the shocks developed when the wheel runs into a pot-hole for example are absorbed by movement of the wheel rearwardly. The subframes are constructed to be capable of articulation in a manner retaining optimum wheel geometry control whilst reducing input to the vehicle chassis of loads, and noise and vibration.

The movements of the two subframes can be restrained mechanically, or the unit can instead be incorporated into an active suspension system.

BRIEF DESCRIPTION OF THE DRAWING

In the accompanying drawing,
the single figure is a schematic partial perspective view of an exemplary suspension unit embodying the invention, looking rearwardly and outwardly from the vehicle body.

Referring to the accompanying drawing, the suspension unit illustrated therein is intended for a vehicle such as a passenger road vehicle, and is particularly suited to suspension of a front wheel in a front wheel drive vehicle. The unit comprises an outer subframe 1 having upper and lower pairs 2 and 4 of wishbone members joined at their apices to upper and lower ends of an upright member 5 from which extends an axle 6 for a road wheel 7. A spring or damping means 8 extends between the outer subframe 1 and the vehicle frame or chassis 9 so that the subframe serves to locate the vehicle wheel, whilst being able to react suspension forces. The spring or damping means 8 may be passive or active, that is, part of an active suspension system, preferably of the kind disclosed in EP-A-0 114 757. The subframe 1 constituted by the members 2, 4 and 5 is carried by a second or inner subframe 10 which is compliantly mounted on the vehicle chassis 9.

The subframe 10 comprises a channel-shaped lower member 11 of which the centre web is presented outwardly and mounts a forward pair 12 and a rear pair 14 of apertured flanges, in which the inner ends of the lower wishbone member 4 are journalled about a generally horizontal axis extending lengthwise of the vehicle. Extending upwardly from the member 11 in a triangular configuration are forward and rear upper subframe members 16,17 from which extend forward and rear stub shafts 19,20 on which the inner ends of the upper wishbone member 2 are journalled, again about a horizontal longitudinally extending axis. The length of the subframe member 17 exceeds that of the member 16, so the upper ends of the members join at a position nearly above flanges 12.

The inner subframe 10 is carried by the vehicle chassis 9 by lower and upper forward resilient mountings 21 and 22 and by a lower rear resilient mounting 24. The resilient mounting 21 is received within the lower subframe member 11 and comprises a rigid outer sleeve 25 secured to the chassis 9, a mounting bolt 26 extending through the sleeve and secured to the subframe member, and a resilient bush 26, for example of rubber, between the bolt and the sleeve. The mountings 22 and 24 are of similar construction. The mountings 21 and 24 have their axes vertical and are located in the subframe member 11 in the regions of the flanges 12 and 14 respectively. The resilient mounting 22 is located at the apex formed by the two upper frame members 16,17 and has its axis horizontal.

The lower rear mounting 24 provides compliance for movement of the inner subframe 10 about the axis of the forward mounting 22 which is directional, being greater in respect of inward movement of the rear end of the subframe 10 than for outward movement. The mounting 24 includes for this purpose a resilient bush 30 with inner and outer axially extending slots 31 and 32 of which the former is radially narrower than the latter and is located further outwardly.

Preferably, the outer subframe 1 stiffly opposes vertically acting forces and the resilient mountings 21 and 22 are very stiff, to oppose forces acting transversely to the upright member 5. The mounting 21 may be fitted with snubber means permitting movement of the order of 1 mm only. Rotation about the mounting 21, allowing rearward movement of the wheel 7, is however accommodated relatively readily. The inner subframe 10 is thus also capable of reacting suspension forces, its articulation being restrained for optimum wheel geometry control. The restraint imposed on the outer subframe 1 by the spring or damping means 8 is of course capable of accommodating the movements of the inner subframe 10.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

We claim:

1. A suspension unit for mounting a rod wheel to a road vehicle, said suspension unit comprising:
   a rigid triangular inner subframe,
   upper and lower forward compliant mounting means and a lower rear compliant mounting means mounting said inner subframe to said vehicle and providing compliance to horizontal movement of said road wheel, each of said mounting means being located in the region of a respective one of the corners of said triangular subframe, and said rear mounting means affording greater compliance than said forward mounting means,
   an outer subframe providing compliance to vertical road wheel movement, and
   axle means for said road wheel extending from said outer subframe.

2. The suspension unit of claim 1 wherein said rear mounting means affords greater compliance for rearward road wheel movement than for forward road wheel movement.

3. The suspension unit of claim 1 wherein each of said compliant mounting means comprises a resilient sleeve, said sleeves of said lower mounting means being axially substantially vertical and said sleeve of said upper mounting means being axially substantially horizontal.

4. The suspension unit of claim 1 wherein said, forward and rear compliant mounting means each include resilient sleeve members providing said compliance, said sleeve member of said rear mounting means being axially apertured to provide said greater compliance.

5. The suspension unit of claim 1 wherein said outer subframe comprises upper and lower wishbone structures, a generally upright member joining said upper and lower wishbone structures at the outboard ends thereof, said axle means extending from said generally upright member.

6. The suspension unit of claim 1 wherein said compliance to said horizontal road wheel movement is limited by said forward and rear compliant mounting means and further comprising restraint means extending between said outer subframe and said vehicle frame or body, said restraint means functioning to limit said vertical road wheel movement.

7. In a road vehicle having a vehicle body and road wheels for supporting the vehicle body on a road surface, a suspension system for a road wheel comprising:
   an outer subframe,
   axle means carried by said outer subframe and mounting said road wheel
   a rigid inner subframe,
   first mounting means mounting said outer subframe to said inner subframe, said outer subframe and said first mounting means permitting vertical movement of said road wheel,
   restraint means acting between said outer subframe and said vehicle body to restrain said vertical wheel movement and to have a locating effect on said road wheel and,
   second mounting means compliantly mounting said inner subframe to said vehicle body, said second mounting means being adapted to permit limited pivoting of said inner subframe about a generally upright axis and having a locating effect on said road wheel.

8. The vehicle of claim 7 wherein said generally upright axis is located in said second mounting means in a forward region thereof in the normal direction of vehicle movement.

9. The vehicle of claim 7, said road vehicle being a front wheel drive vehicle and having two of said suspension units each mounting one of the driven front wheels.

10. The vehicle of claim 7 wherein said outer subframe comprises upper and lower wishbone structures, and an upright member carrying said axle means and joining said wishbone structures at the outer ends thereof, and wherein said inner subframe comprises a lower member and upper forward and rear members in a generally upright triangular configuration, said lower wishbone structure being carried by said lower inner subframe member and said upper wishbone structure being carried by said upper inner subframe members.

11. A suspension unit for mounting a road wheel to a road vehicle, said suspension unit comprising:
    an outer subframe, said outer subframe comprising upper and lower wishbone structures each having an inner end and an outer end, a road wheel carrier, and means mounting said road wheel carrier to said wishbone structure outer ends,
    a rigid inner subframe, and
    forward and rear compliant mounting means mounting said wishbone structure inner ends onto said rigid inner subframe at forward and rear positions thereon, said compliant mounting means having greater compliance to forces tending to turn said inner subframe rearwardly about said forward compliant mounting means than to forces acting in other directions.

12. The suspension unit of claim 11 wherein said forward and rear compliant mounting means comprises resilient bushes, said resilient bush of said rear mounting means having slot means therethrough to provide said greater compliance.

13. The suspension unit of claim 12 wherein said slot means comprises inner and outer slots, said outer slot being radially narrower than said inner slot and being located radially outwardly thereof.

14. The suspension unit of claim 11 wherein said forward compliant mounting means comprises upper and lower mounting means each including a resilient bush and wherein said rear compliant mounting means includes a single resilient bush structured so as to provide said greater compliance.

15. The suspension unit of claim 14 wherein said inner subframe comprises a channel member containing said resilient bushes of said lower and rear mounting means with the axes thereof generally upright.

16. The suspension unit of claim 11 wherein said forward compliant mounting means comprises upper and lower mountings each including a resilient bush, said bush of said upper mounting having its axis generally horizontal and said bush of said lower mounting having its axis generally upright, and wherein said rear mounting means comprises a mounting having a resilient bush having its axis upright and having slots extending axially therethrough to provide said greater compliance.

* * * * *